United States Patent
Mian et al.

(10) Patent No.: US 8,050,660 B2
(45) Date of Patent: **\*Nov. 1, 2011**

(54) APPARATUS AND METHOD FOR HANDLING MESSAGING SERVICE MESSAGE ADAPTATION

(75) Inventors: Mubashir A. Mian, Morton Grove, IL (US); Naga Venkata S. Korukonda, Grayslake, IL (US); Ajit Kumar Panda, Vernon Hills, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 880 days.

This patent is subject to a terminal disclaimer.

(21) Appl. No.: 11/370,138

(22) Filed: Mar. 7, 2006

(65) Prior Publication Data

US 2007/0213077 A1    Sep. 13, 2007

(51) Int. Cl.
*H04M 1/725* (2006.01)

(52) U.S. Cl. .................. 455/412.1; 455/412.2; 455/466; 455/414.1; 455/414.4

(58) Field of Classification Search ............... 455/412.1, 455/412.2, 414.1, 414.4, 466

See application file for complete search history.

(56) References Cited

U.S. PATENT DOCUMENTS

| | | | |
|---|---|---|---|
| 7,054,905 B1* | 5/2006 | Hanna et al. | 709/206 |
| 7,274,926 B1* | 9/2007 | Laumen et al. | 455/414.1 |
| 2002/0099777 A1* | 7/2002 | Gupta et al. | 709/206 |
| 2003/0018795 A1 | 1/2003 | Ebling et al. | |
| 2004/0242206 A1* | 12/2004 | Dorr | 455/412.1 |
| 2006/0135142 A1* | 6/2006 | Repka | 455/418 |
| 2006/0161631 A1* | 7/2006 | Lira | 709/206 |

\* cited by examiner

*Primary Examiner* — Patrick Edouard
*Assistant Examiner* — Shantell L Heiber
(74) *Attorney, Agent, or Firm* — Greg J. Cunningham

(57) ABSTRACT

A method and apparatus for handling messaging service message adaptation. An original message is received from an originating communication device, the original message based on a wireless communication message protocol, the original message being of a first message type. The message is modified according to preferences of a message recipient communication device to generate a second message of a second message type. The second message is sent to the message recipient communication device. A modification notification is sent to the originating communication device, the modification notification indicating that the original message was modified.

13 Claims, 3 Drawing Sheets

APPARATUS AND METHOD FOR HANDLING MESSAGING SERVICE MESSAGE ADAPTATION

CROSS-REFERENCE TO RELATED APPLICATIONS

This application is related to application entitled "Method and Apparatus For Handling Messaging Service Message Adaptation," Motorola case number CS28394RL, filed on even date herewith and commonly assigned to the assignee of the present application.

BACKGROUND

1. Field

The present disclosure is directed to a method and apparatus for handling messaging service message adaptation. More particularly, the present disclosure is directed to informing a multimedia message user when content of the multimedia message is adapted.

2. Description of Related Art

Presently, mobile communication devices are capable of sending multimedia service (MMS) messages. MMS messages can include combination of multimedia content such as audio, image and videos along with text. For example, one mobile communication device may send a MMS message to a second device. However, the second device may not be able to output, display, or otherwise handle the message. For example, a first device may send a video message to a second device. However, the second device may be, for example, an older cellular phone or a MMS capable client that is not capable of receiving large messages or is not capable of displaying a video message. In this case, after receiving the message from the first device and before forwarding it to the second device, a multimedia serving center (MMSC) can adapt the message so it can be output on the second device. For example, the MMSC can convert video into multiple of pictures for display on the second device. Alternately, the MMSC may remove the video and only send text associated with the message.

Unfortunately, a user of the first device is not informed that the message was adapted. Furthermore, the second user has no method of viewing the important information removed from the message once it is modified or deleted. This can be especially problematic in mission critical situations where it is imperative that the user of the second device receives all information sent in the message. For example, the second user may be using a lower end cellular phone when traveling or when their primary cellular phone is in the shop. Yet, the first user may not be aware of the change and may send business imperative or emergency information to the second user. However, neither user may be aware that the content was altered. Also, the second user is not able to receive the unaltered message.

Thus, there is a need for an improved method and apparatus for handling messaging service message adaptation.

SUMMARY

A method and apparatus for handling messaging service message adaptation. An original message is received from an originating communication device, the original message based on a wireless communication message protocol, the original message being of a first message type. The original message is modified according to preferences of a message recipient communication device to generate a second message of a second message type. The second message is sent to the message recipient communication device. The original message is sent to an alternate message recipient based on the original message being modified.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
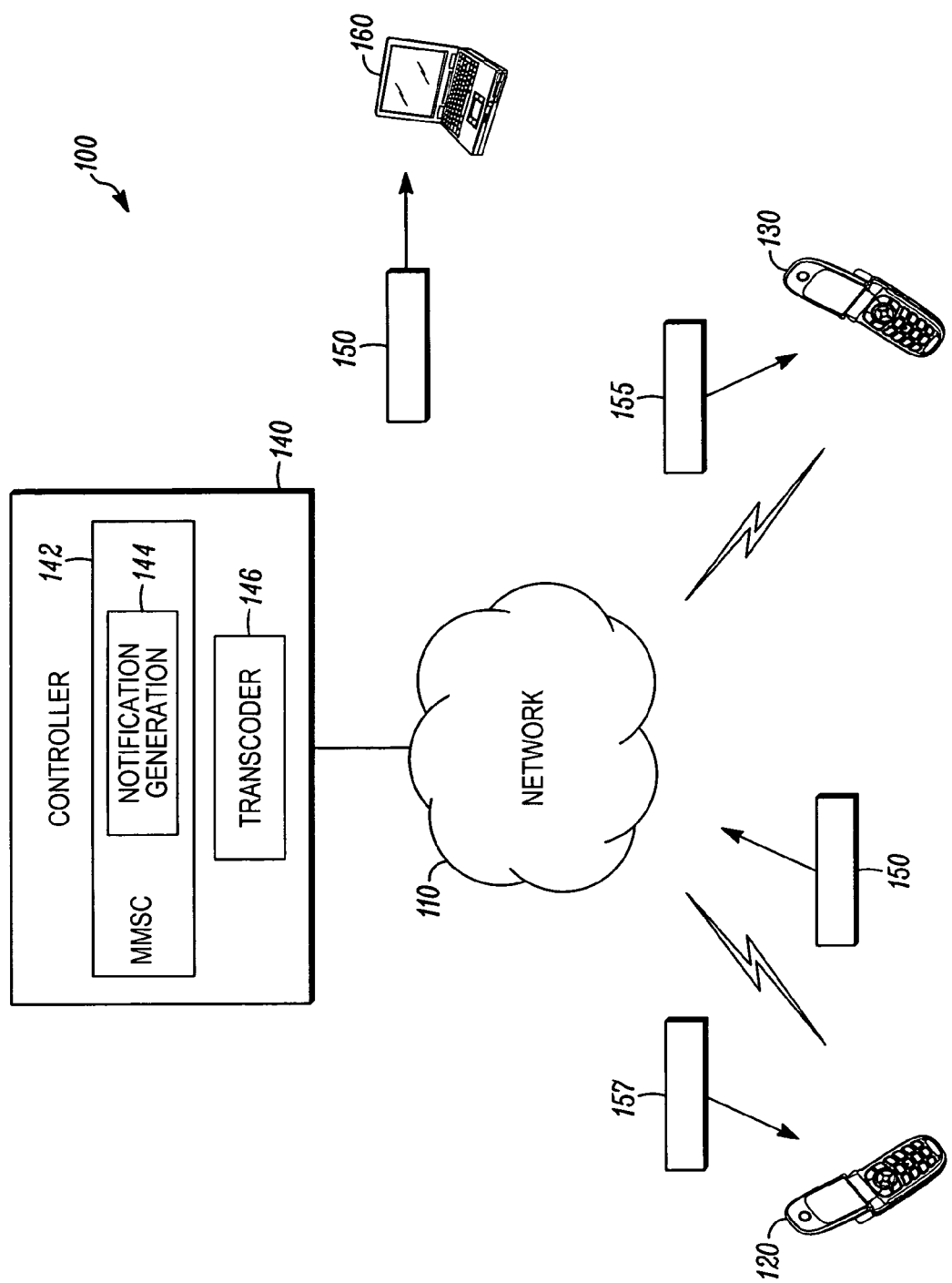
FIG. 1 is an exemplary block diagram of a system according to one embodiment.

FIG. 1 is an exemplary block diagram of a system 100 according to one embodiment. The system 100 can include a network controller 140, a network 110, a first terminal 120, and a second terminal 130. The system 100 can also include an alternate message recipient 160. The terminal 120 may be a message originating communication device and the terminal 130 may be a message recipient communication device. For example, the terminals 120 and 130 and the alternate message recipient 160 may be wireless communication devices, such as wireless telephones, cellular telephones, personal digital assistants, pagers, personal computers, selective call receivers, or any other device that is capable of sending and receiving messaging service messages on a network including wireless network.

In an exemplary embodiment, the network controller 140 is connected to the network 110. The controller 140 may be located at a base station, at a radio network controller, or anywhere else on the network 110. The controller 140 can include a multimedia service center 142 and a transcoder 146. The multimedia service center 142 can include a notification generation module 144. The multimedia service center 142, the notification generation module 144, and the transcoder 146 are coupled to each other for sharing data, but may or may not be at the same physical location.

The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the multimedia service center 142 can receive an original message 150 from an originating communication device 120. The original message 150 can be based on a wireless communication message protocol, the message being of a first message type. The wireless communication message protocol can be a wireless telecommunication message protocol, such as a cellular communication message protocol, such as a text messaging protocol, a short messaging service protocol, an enhanced messaging service protocol, a multimedia messaging service protocol, or the like. The transcoder 146 can modify the original message 150 according to preferences of a message recipient communication device 130 to generate a second message 155 of a second message type. Modifying the original message 150 can include transcoding the original message 150 based on a mismatch between the content of the original message 150 and the capabilities of the message recipient communication device 130. For example, transcoding the original message 150 can include converting a video message to a multiple picture message, converting an embedded audio from one format to another format, deleting multimedia content from a multimedia message while retaining text in the original message 150, or any other transcoding method. Preferences of the message recipient communication device 130 may be capabilities of the recipient communication device 130. The multimedia service center 142 can send the second message 155 to the message recipient communication device 130 and send the original message 150 to an alternate message recipient 160 based on the original message 150 being modified.

The multimedia service center 142 can also provide an option to the originating communication device 120 to have the original message 150 sent to the alternate message recipient 160 based on the original message 150 being modified. The multimedia service center 142 can additionally provide an option to the message recipient communication device 130 to have the original message 150 sent to the alternate message recipient 160 based on the original message 150 being modified. The original message 150 can be a multimedia messaging service message and the message recipient communication device 130 can be a cellular communication device. The alternate message recipient 160 can be based on an e-mail address, a telephone number, or any other means of indicating a message recipient. Thus, the alternate message recipient can be a device capable of handing the original message, such as a personal computer of a cellular phone with appropriate capabilities.

The multimedia service center 142 can also send a message waiting notification to the message recipient communication device 130 and receive a retrieval message from the message recipient communication device 130, the retrieval message including information indicating the preferences of the message recipient communication device 130. The information indicating the preferences of the message recipient communication device can be directions to a preferences location, the preferences location including preferences of the message recipient communication device 130.

According to another related embodiment, the multimedia service center 142 can receive an original message 150 from an originating communication device 120. The original message 150 can be based on a wireless communication message protocol and can be of a first message type. The multimedia service center 142 can send a message waiting notification to the message recipient communication device 130 and receive a retrieval message from the message recipient communication device 130. The retrieval message can include information indicating the preferences of the message recipient communication device 130. For example, the information indicating the preferences of the message recipient communication device 130 can include directions to a preferences location, the preferences location including preferences of the message recipient communication device 130. The preferences of the message recipient communication device 130 can be capabilities of the message recipient communication device 130. The transcoder 146 can modify the original message 150 according to preferences of a message recipient communication device 130 to generate a second message 155 of a second message type. The multimedia service center 142 can then send the second message 155 to the message recipient communication device 130. The modification notification generation module 144 can generate a modification notification 157 indicating that the original message was modified. The multimedia service center 144 can then send the modification notification 157 to the originating communication device 120. The modification notification 157 can include the second message 155 of the second message type. Alternately, the modification notification 157 can provide an option to retrieve the second message 155 of the second message type. The multimedia service center 142 can send the second message 155 to the originating communication device 120 if a user of the originating communication device 120 exercises the option to retrieve the second message 155.

The transcoder 146 can transcode the original message 150 based on a mismatch between the content of the original message 150 and the preferences of the message recipient communication device 130. For example, the transcoder 146 can transcode the original message 150 by converting a video message to a slideshow message, by converting an audio format of a message attachment, by deleting multimedia content from a multimedia message while retaining text in the original message 150, or by any other useful modification.

Thus, if a multimedia service center 142 performs severe content adaptation on a message for delivery to the recipient client 130, the sender 120 of the message can be informed about what happened to the message. Also, the recipient 130 of the message may have an option to receive the adapted message 155 on the mobile client 130 and the un-adapted message 150 can be forwarded to an e-mail address, a mobile station international integrated services digital network number, a short code address, a universal resource locator, or any other useful address for retrieval on a terminal 160 that can play the un-adapted message. Accordingly, the originator 120 can be informed of what was delivered and/or the recipient can retrieve the adapted message 155 immediately and the original un-adapted message 150 can be viewed by the recipient in way of e-mail on a desktop-like or other compatible environment 160.

Therefore, the message originator 120 can have a mechanism to be notified when the message 150 sent by that user has been severely adapted for the terminating messaging client 130. In addition, the originator 120 may request a copy of the message 155 that is being sent as a final message to the terminating party 130. Furthermore, the originator 120 may be provided with an alternate e-mail or other identifier for the recipient address 160. Also or alternately, the recipient 130 can have a mechanism that provides an alternate e-mail or other address 160 for the original message 150 to be forwarded to. The recipient 130 can get the adapted message 155 on the messaging client and the un-adapted, original message 150, can be forwarded to an alternate delivery mechanism 160.

Accordingly, this disclosure can provide a means for the sender 120 to know if the intended recipient 130 got the entire message or parts of the message was removed because of the end user terminal capabilities. This disclosure can also provide an opportunity for the recipient 130 to receive the un-adapted message 150 via the alternate delivery mechanism 160. Thus, if a multimedia messaging service is used for business or some application where it may be important that all data is transmitted, when a message 150 is severely altered or parts of the data are removed, then it can be of utmost importance to inform the sender 120 of what was delivered and what was not. For example, Global System for Mobile (GSM) communication phones may be open to these kind of problems or mishaps where user of high end phone may be borrowing a low end phone temporarily either from a service shop that is servicing the high end phone or when the user is just trying out a new phone with lesser capability while a message is sent to him that his phone is not capable of handling. For example a video message may be sent to a non-video handset. The present disclosure can allow a sender to be informed when the message has been adapted to allow it to be viewed on a device that is not compatible with the original message format. The present disclosure can also allow an un-adapted message to be sent to an alternate recipient that is capable of displaying the original message.

Figure 2:
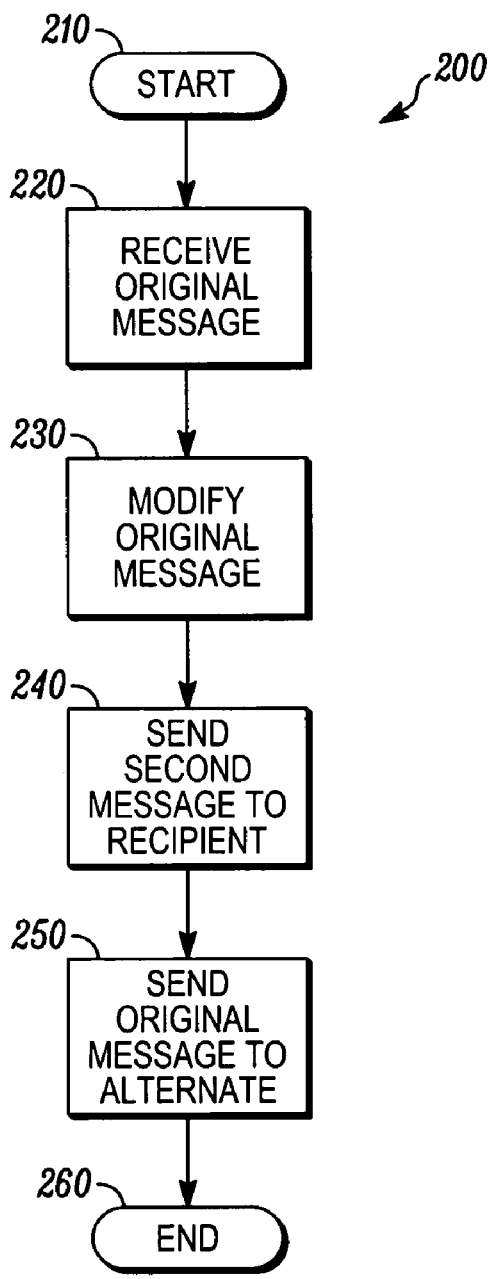
FIG. 2 is an exemplary flowchart illustrating the operation of a controller according to one embodiment.

FIG. 2 is an exemplary flowchart 200 illustrating the operation of the controller 140 according to one embodiment. In step 210, the flowchart begins. In step 220, the controller 140 can receive an original message from an originating communication device. The original message can be based on a wireless communication message protocol and can be of a first message type. At this point, the controller 140 may send a message waiting notification to the message recipient communication device and receive a retrieval message from the message recipient communication device, the retrieval message including information indicating the preferences of the message recipient communication device. The information indicating the preferences of the message recipient communication device can include directions to a preferences location, the preferences location including preferences of the message recipient communication device. The preferences of the message recipient communication device can be capabilities of the recipient communication device.

In step 230, the controller 140 can modify the original message according to preferences of a message recipient communication device to generate a second message of a second message type. The controller 140 can modify the original message by transcoding the original message based on a mismatch between the content of the original message and the preferences of the message recipient communication device. Transcoding the message for example, can include converting a video message to a multiple picture message, removal of video altogether, converting audio from one format to another, conversion of a high resolution media to a low resolution media, or any other method of transcoding a message. The controller 140 can provide an option to the originating communication device to have the original message sent to the alternate message recipient based on the original message being modified. The controller 140 may also provide an option to the message recipient communication device to have the original message sent to the alternate message recipient based on the original message being modified.

In step 240, the controller 140 can send the second message to the message recipient communication device. In step 250, the controller can send the original message to an alternate message recipient based on the original message being modified. In step 260, the flowchart 200 can end.

Figure 3:
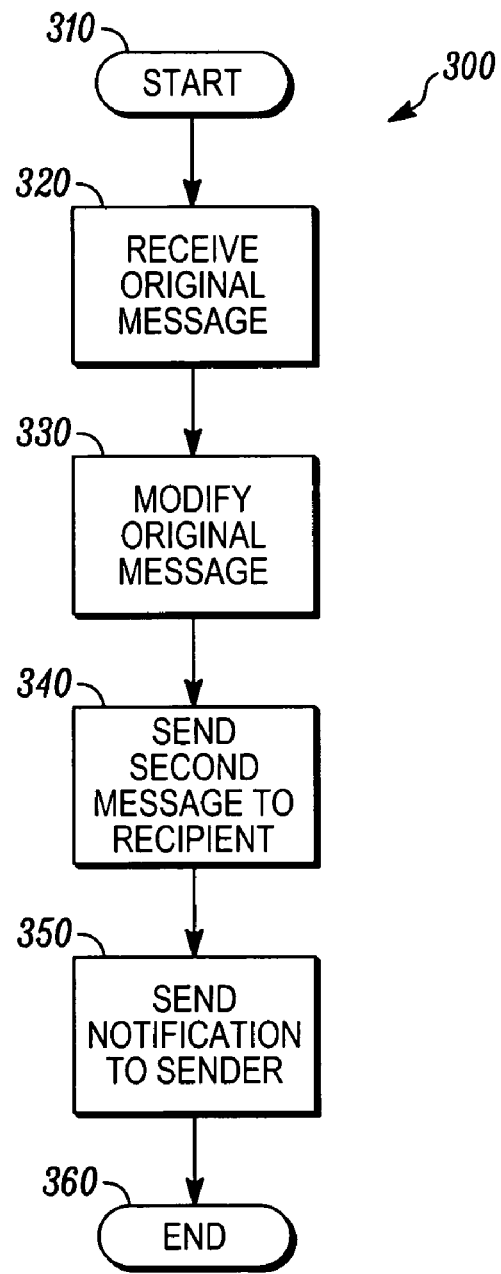
FIG. 3 is an exemplary flowchart illustrating the operation of the controller according to another related embodiment.

FIG. 3 is an exemplary flowchart 300 illustrating the operation of the controller 140 according to another related embodiment. In step 310, the flowchart begins. In step 320, the controller 140 can receive an original message from an originating communication device, the original message based on a wireless communication message protocol and the original message being of a first message type. At this point, the controller 140 may send a message waiting notification to the message recipient communication device and receive a retrieval message from the message recipient communication device, the retrieval message including information indicating the preferences of the message recipient communication device. The information indicating the preferences of the message recipient communication device can include directions to a preferences location, the preferences location including preferences of the message recipient communication device. Preferences of the message recipient communication device can be capabilities of the recipient communication device.

In step 330, the controller 140 can modify the original message according to preferences of a message recipient communication device to generate a second message of a second message type. The controller 140 can modify the original message by transcoding the original message based on a mismatch between the content of the original message and the preferences of the message recipient communication device. The controller 140 can transcode the message by converting a video message to a slideshow message, by converting an audio format of a message attachment, and/or by deleting multimedia content from a multimedia message while retaining text in the original message.

In step 340, the controller 140 can send the second message to the message recipient communication device. In step 350, the controller 140 can send a modification notification to the originating communication device, the modification notification indicating that the original message was modified. The modification notification can be the actual second message of the second message type. Alternately, the modification notification can include an option to retrieve the second message of the second message type. If the originating communication device exercises the option, the controller 140 can then send the second message to the originating communication device. In step 350, the flowchart 300 can end.

Figure 4:
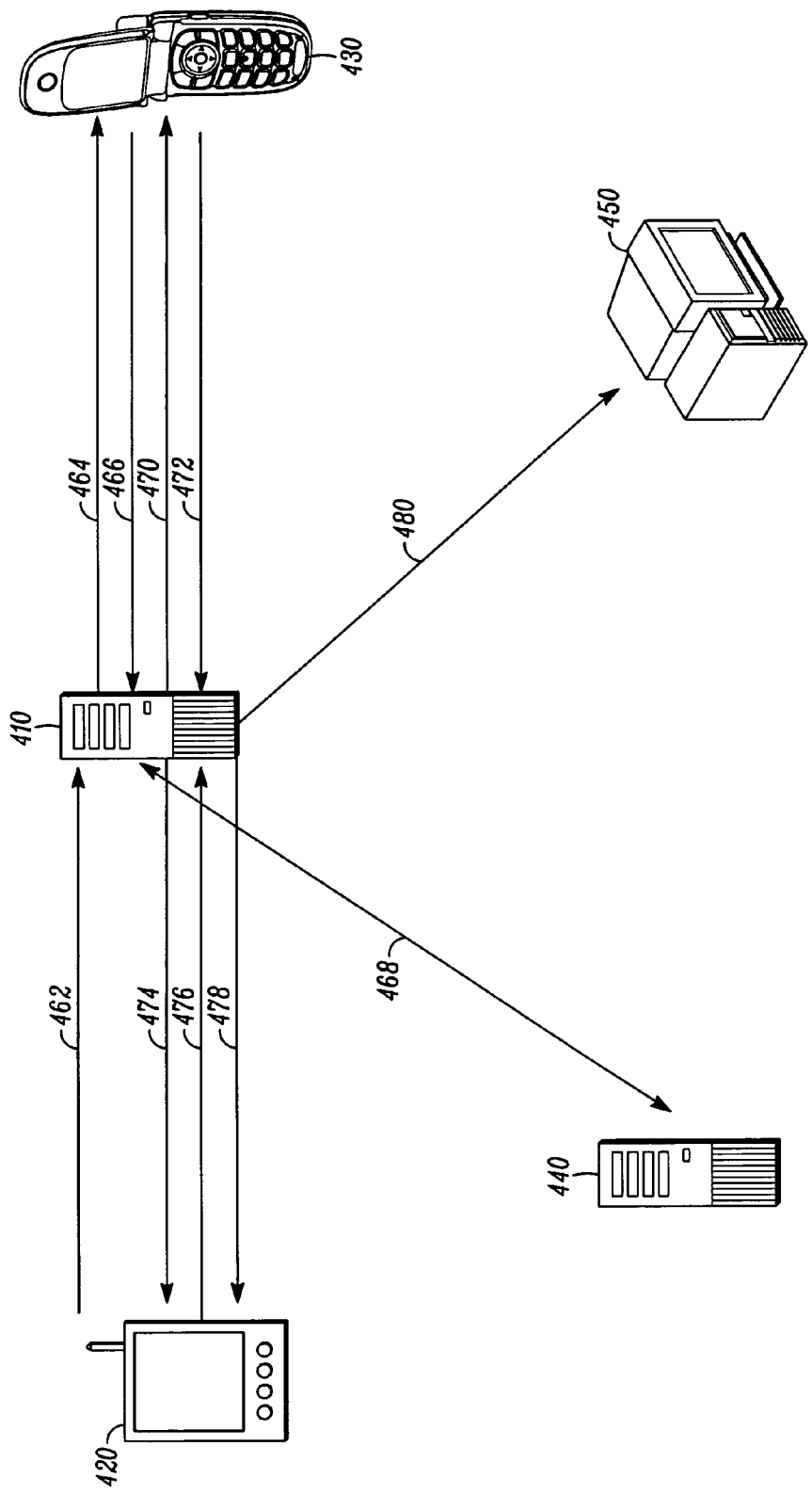
FIG. 4 is an exemplary signal flow diagram of a system according to a related embodiment.

FIG. 4 is an exemplary signal flow diagram of a system 400 according to another related embodiment. The system 400 can include a server 410, a first device 420, a second device 430, a transcoder 440, and an alternate device 450. In step 462, the first device 420 can compose a message and send it to the server 410. In step 464, the server 410 can send a notification to the second device 430 notifying the second device 430 of the message waiting at the server 410. In step 466, the second device 430 can send a response message for the retrieval of the message from the server 410. The response message can include information from the second device 430 regarding the capabilities of the second device 430. For example, the information may be a pointer that indicates an address or location where the server 410 can find the device information. As another example, the information may relate to the type of device or to user rules for the second device 430. The rules may be preferences for different types of messages desired at different times, different locations, or different devices used by the user. The server 410 may then determine a need for transcoding the message based on a mismatch between the content in the message and the capabilities, preferences, and/or rules relating to the second device 430. If transcoding is needed, in step 468 the transcoder 440 can adapt the message content to be compatible with the second device 430. If the message is transcoded, the server 410 can determine an alternate delivery address. This alternate delivery address can be determined according to the user rules, determined from other information received from the first device 420, determined by querying the first device 420 for an alternate delivery address, determined by querying the second device 430 for an alternate delivery address, or determined by any other useful method for determining an alternate delivery address. In step 470, the server 410 can send the transcoded message to the second device 430. In step 472, the second device 430 can send an acknowledgement to the server 410 that the transcoded message was received.

In step 474, the server 410 can send a message to the first device 420 indicating a transcoded message was delivered to the second device 430. In this step, the server 410 can send the transcoded message to the first device 420. In this step, the server 410 may also check with the first device 420 about rules regarding transcoded message delivery. For example, the server may check default rules of the first device 420 or may send an option to the user of the first device giving options for actions regarding delivery of a transcoded message. In step 476, the second device can send information to the server 410 regarding an action to take regarding the delivery of the transcoded message. For example, the server 410 may only send a notification to the first device 420 in step 474 and may only send the transcoded message back to the first device 420 if it is requested in step 476. In step 478, the server 410 can send the transcoded message to the first device 420. In step 480, the server 410 can send the transcoded message to the alternate device 450. The server 410 may perform step 480 at any point after transcoding the message in step 440.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method comprising:
    receiving an original message from an originating communication device, the original message based on a wireless communication message protocol, the original message being of a first message type;
    modifying the original message according to preferences of a message recipient communication device to generate a second message of a second message type;
    sending the second message to the message recipient communication device;
    sending a modification notification to the originating communication device based on a preference set in the message recipient communication device, the modification notification indicating that the original message was modified, wherein the modification notification further includes an option to retrieve the second message of the second message type, and sending the second message to the originating communication device;
    sending a message waiting notification to the message recipient communication device; and
    receiving a retrieval message from the message recipient communication device, the retrieval message including information indicating the preferences of the message recipient communication device.

2. The method according to claim 1, wherein the modification notification comprises an indication of differences between the original message and the second message.

3. The method according to claim 1, wherein modifying the original message further comprises transcoding the original message based on a mismatch between the content of the original message and the preferences of the message recipient communication device.

4. The method according to claim 3, wherein transcoding the message comprises one selected from the group of converting a video message to a multiple picture message, removal of video altogether, converting audio from one format to another, conversion of a high resolution media to a low resolution media.

5. The method according to claim 1, wherein the information indicating the information indicating the preferences of the message recipient communication device comprises directions to a preferences location, the preferences location including preferences of the message recipient communication device.

6. A wireless network controller comprising:
    a multimedia service center configured to receive an original message from an originating communication device, the original message based on a wireless communication message protocol, the original message being of a first message type; and
    a transcoder coupled to the multimedia service center, the transcoder configured to modify the original message according to preferences of a message recipient communication device to generate a second message of a second message type,
    wherein the multimedia service center is further configured to send the second message to the message recipient communication device,
    wherein the multimedia service center includes a modification notification generation module configured to generate a modification notification indicating that the original message was modified,
    wherein the multimedia service center is further configured to send the modification notification to the originating communication device based on a preference set in the message recipient communication device, wherein the modification notification includes an option to retrieve the second message of the second message type, further comprising sending the second message to the originating communication device, and wherein the multimedia service center is further configured to send a message waiting notification to the message recipient communication device and receive a retrieval message from the message recipient communication device, the retrieval message including information indicating the preferences of the message recipient communication device.

7. The wireless network controller according to claim 6, wherein the modification notification comprises an indication of differences between the original message and the second message.

8. The wireless network controller according to claim 6, wherein the modification notification includes an option to retrieve the second message of the second message type.

9. The wireless network controller according to claim 8, wherein the multimedia service center is further configured to send the second message to the originating communication device.

10. The wireless network controller according to claim 6, wherein the transcoder is further configured to transcode the original message based on a mismatch between the content of the original message and the preferences of the message recipient communication device.

11. The wireless network controller according to claim 10, wherein the transcoder is further configured to transcode by one selected from the group of converting a video message to a slideshow message, converting an audio format of a message attachment, and deleting multimedia content from a multimedia message while retaining text in the original message.

12. The wireless network controller according to claim 6, wherein the information indicating the preferences of the message recipient communication device comprises directions to a preferences location, the preferences location including preferences of the message recipient communication device.

13. A method comprising:

receiving an original message from an originating communication device, the original message based on a wireless communication message protocol, the original message being of a first message type;

sending a message waiting notification to a message recipient communication device; receiving a retrieval message from the message recipient communication device, the retrieval message including information indicating capabilities of the message recipient communication device;

transcoding the original message according to preferences of the message recipient communication device to generate a transcoded message of a transcoded message type;

sending the transcoded message to the message recipient communication device; and sending a modification notification to the originating communication device based on a preference set in the message recipient communication device, the modification notification indicating that the original message was transcoded and how the transcoded message differs from the original message, wherein the modification notification further includes an option to retrieve the transcoded message and sending the transcoded message to the originating communication device.

* * * * *